No. 864,003. PATENTED AUG. 20, 1907.
S. KILHEFNER.
BLANKET FOR COWS.
APPLICATION FILED MAR. 25, 1907.
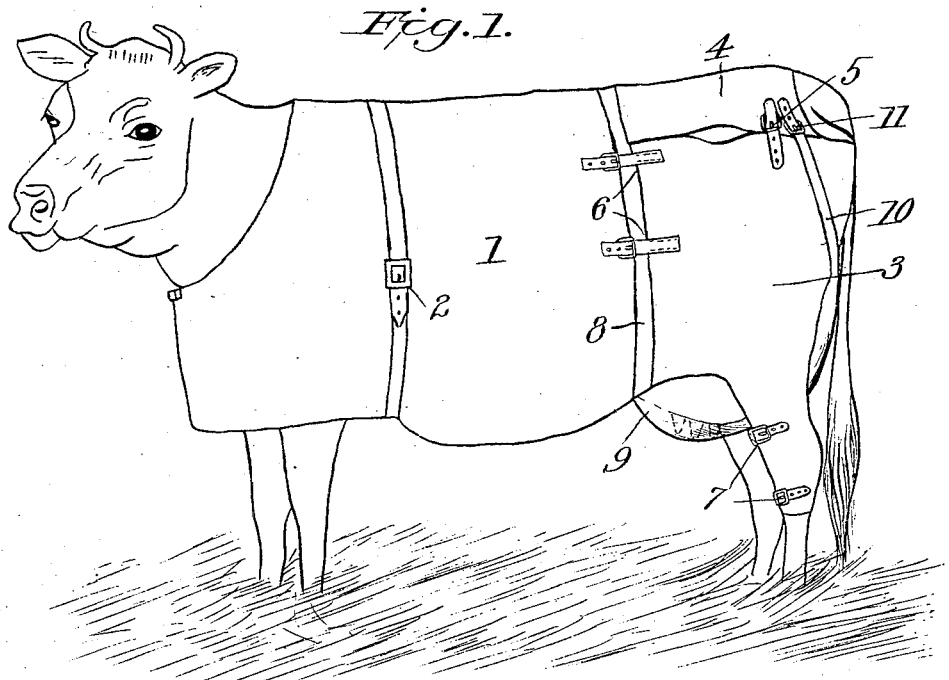
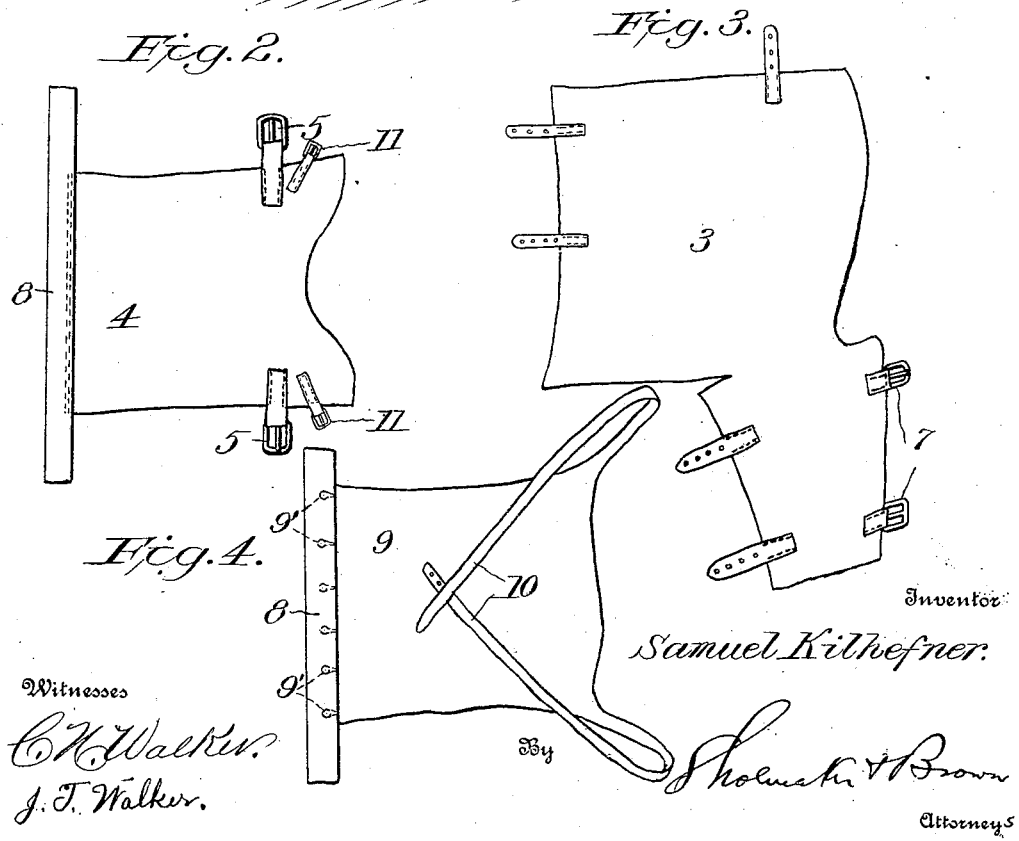
Witnesses
C. N. Walker.
J. T. Walker.
Inventor
Samuel Kilhefner.
By Sholmski & Brown
Attorneys

UNITED STATES PATENT OFFICE.

SAMUEL KILHEFNER, OF ASHLAND, OHIO.

BLANKET FOR COWS.

No. 864,003.  Specification of Letters Patent.  Patented Aug. 20, 1907.

Application filed March 25, 1907. Serial No. 364,423.

*To all whom it may concern:*

Be it known that I, SAMUEL KILHEFNER, a citizen of the United States, residing at Ashland, in the county of Ashland and State of Ohio, have invented certain new and useful Improvements in Blankets for Cows, of which the following is a specification.

This invention relates to blankets for cows.

One object is to provide a combined sanitary stable blanket and milking jacket.

Another object resides in the provision of a sectional blanket of the nature stated embodying such characteristics that the body of the cow may be kept warm, protected from the filth of the stall or other place, and dressed for the milking operation.

With the above and other objects in view the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings: Figure 1 illustrates the application of my improved blanket. Fig. 2 is a detail view of the top or supporting section of the blanket; Fig. 3 is a detail view of the hind-quarter section; and Fig. 4 is a detail view of the udder section.

Referring now more particularly to the accompanying drawings, the reference character 1 indicates the main body section of the blanket designed principally for the purposes of comfort in cool or cold weather and which may be dispensed with in warm weather or if for any other reason deemed advisable. This section 1 is preferably supported against accidental displacement by a buckle or other strap 2, although any other suitable means may be employed.

The blanket section 3 is designed to cover the hind parts of the cow, including the hind quarters from the lower end of the hock joints up to a line near the hip joint bone where it is attached to and supported from both ends or sides of the top blanket section 4 through the instrumentality of the short strap and buckle connections 5. This hind quarter section of the blanket is also secured to the main blanket section 1, if used, on both sides of the cow, by means of the strap and buckle connections 6. At the hock joints and up to a point near the udder of the cow the section 3 is formed so that it may encircle the hind legs of the cow and be buckled, buttoned or otherwise fastened, as at 7. Thus the hind quarter section may be easily and quickly detached, and it is rendered so, first, because it is the part that becomes soiled with the filth of the cow when she is lying down in the stall; secondly, because it permits of this soiled part being substituted with an identical one, but clean, kept in reserve for such purpose and particularly for the milking operation, and which is an extra precaution against dirt or other foreign substances getting into the milk from that part of the body of the cow when the pail is near or beneath; thirdly, because it permits of this part of the blanket being washed or cleaned without the necessity of bothering with or handling other portions of the blanket; fourthly, because it permits of its being made separate and apart from the other portions and made of more lasting material or rubber which affords proper protection and is more easily washed or otherwise cleaned.

Circumscribing or girdling the body of the cow immediately in front of the udder is a band 8 to which the inner end of the top section 4 is permanently secured, the outer end of the section extending to the base of the tail and down upon both sides to a line near the hip bone of the cow where the hind quarter section is suspended from it. This belt 8 is disposed under the main body section 1, if the latter is used so that if said section is removed from the body of the cow the top and other rear sections will not become loosened or displaced.

The character 9 indicates a poke-like covering or bag for the entire udder of the cow and buttoned, buckled or otherwise suitably secured at its front end to the aforesaid girdling band 8 beneath the cow, as at 9′, with its opposite or rear end provided with the two suspending straps 10, which, when in use, diverge upwardly upon opposite sides of the hind quarters and connect with the buckles 11 carried by the top or supporting section 4, whereby the udder section may be easily and quickly removed for cleaning purposes or for the substitution of another or detached at one or both ends and disposed to permit of the milking operation. This udder section protects the udder from filth of the stall when the cow is lying down or from injury from briers or other substances or articles during the day time.

From the foregoing it will be understood that I provide an exceeding simple, inexpensive, durable and efficient blanket and milking jacket, and one whereby the cow may be easily and quickly dressed or undressed. I also wish it understood that while I have referred to "buckle" connections that I may employ straps provided with button holes for engagement with buttons on the various sections. I deem myself entitled to any form of connecting means falling within the spirit and scope of the appended claims.

What is claimed is:

1. A blanket for cows, comprising a main body section, a supporting section arranged in the rear of the aforesaid section, a hind quarter section detachably secured to the supporting section, an udder section, and means for supporting the udder section.

2. A blanket of the character described comprising a main body section, a band girdling the body of the cow in advance of the udder, a supporting section secured to the band and located over the top of the hind part of the cow, a hind quarter section detachably secured to said supporting section and to the main section and having its lower end formed to embrace the hind legs of the cow above its hocks, an udder section detachably secured at one end to said band, and straps secured to the opposite end of the udder section and detachably secured to said supporting section.

3. A blanket of the class described comprising a band girdling the cow, a supporting covering section secured to the band, a hind quarter section detachably secured to the supporting section, and an udder section suspended from the band and the supporting section.

4. A blanket of the character described comprising a top supporting cover section, a hind quarter section secured to the supporting section, and an udder section having connection with said supporting section.

In testimony whereof I have signed my name to this specification in the presence of two subscribing witnesses.

SAMUEL KILHEFNER.

Witnesses:
H. L. McCRAY,
W. A. McCRAY.